United States Patent [19]
Stahl

[11] Patent Number: 5,388,021
[45] Date of Patent: Feb. 7, 1995

[54] VOLTAGE SURGE SUPPRESSION POWER CIRCUITS

[75] Inventor: George J. Stahl, Severna Park, Md.

[73] Assignee: The United States of America as represented by the Secretary of the Navy, Washington, D.C.

[21] Appl. No.: 946,716

[22] Filed: Sep. 18, 1992

[51] Int. Cl.[6] .............................................. H02H 9/06
[52] U.S. Cl. ..................... 361/56; 361/104; 361/111; 361/118; 361/127
[58] Field of Search ................. 361/56, 111, 119, 120, 361/91, 127, 104, 118

[56] References Cited

U.S. PATENT DOCUMENTS

| | | |
|---|---|---|
| 1,034,197 | 7/1912 | Campos . |
| 1,077,163 | 10/1913 | Rüdenberg . |
| 1,208,530 | 12/1916 | Faccioli . |
| 1,295,553 | 2/1919 | Mathes . |
| 2,730,667 | 1/1956 | Uhlmann ................................ 321/2 |
| 2,939,095 | 5/1960 | Chertok ................................ 333/70 |
| 3,681,612 | 8/1972 | Vogl ................................... 307/105 |
| 3,973,224 | 8/1976 | Gaule ................................... 333/12 |
| 4,023,071 | 5/1977 | Fussell ................................. 361/56 |
| 4,152,743 | 5/1979 | Comstock ............................. 361/56 |
| 4,271,446 | 6/1981 | Comstock ............................. 361/56 |
| 4,342,013 | 7/1982 | Kallman ............................. 333/181 |
| 4,563,720 | 1/1986 | Clark ................................... 361/56 |
| 4,584,622 | 4/1986 | Crosby ................................. 361/56 |
| 4,587,588 | 5/1986 | Goldstein ............................. 361/54 |
| 4,628,394 | 12/1986 | Crosby ................................. 361/56 |
| 4,630,163 | 12/1986 | Cooper ................................. 361/56 |
| 4,649,457 | 3/1987 | Talbot ................................. 361/127 |
| 4,675,772 | 6/1987 | Epstein ................................ 361/56 |
| 4,698,721 | 10/1987 | Warren ............................... 361/110 |
| 5,010,438 | 4/1991 | Brady ................................. 361/56 |
| 5,023,746 | 6/1991 | Epstein ................................ 361/56 |

OTHER PUBLICATIONS

Richman et al "Notes on A Guide on surge Testing For Equipment Connected to Low-Voltage AC Power Circuits" 1983 pp. 1–8.

Keytek Instrument Corp "single-Output, Voltage & Current Surge Generation For Testing Electronic Systems" 1983 IEEE Intl. Symposium on electromagnetic Compatibility.

Primary Examiner—A. D. Pellinen
Assistant Examiner—Sally Medley
Attorney, Agent, or Firm—Charles D. Miller

[57] ABSTRACT

The utilization of clusters of two or more metal oxide varistors (MOVs) connected in parallel for suppressing surges and transients. Particular embodiments are disclosed for both grounded and ungrounded power systems. Also disclosed are two-stage and multi-stage unidirectional and bi-directional suppressors. Uni-directional means that the suppressor is intended to be placed between a source and a load for the purpose-of preventing voltage surges and transients from being propagated from the source into the load. Bi-directional suppressors are intended to be placed between a source and a load and provide suppression in both directions simultaneously.

5 Claims, 8 Drawing Sheets

FIG. 14

| MOV MODEL NO | RMS VOLTAGE RATING | DIAMETER OF MOV DISC (mm) | NO. OF MOVs IN CLUSTER | MAXIMUM I PEAK (AMPS) | MAXIMUM ENERGY (JOULES) | INDIVIDUAL MOV I PEAK IN CLUSTER (AMPS) | MAXIMUM CLUSTER Vc (VOLTS) | APPROX. NO. OF LIFETIME 3KA, 8x20 μs CURRENT PULSES |
|---|---|---|---|---|---|---|---|---|
| V150LA20B | 150 | 20 | 1<br>2<br>3<br>4 | 6500<br>13000<br>19500<br>26000 | 80<br>160<br>240<br>320 | 3000<br>1500<br>1000<br>750 | 540<br>480<br>450<br>430 | 4<br>30<br>80<br>150 |
| V150HE150 | 150 | 32 | 1 | 20000 | 220 | 3000 | 530 | 80 |
| V151DA/DB40 | 150 | 40 | 1 | 30000 | 300 | 3000 | 530 | 100 |
| V151BA/BB60 | 150 | 60 | 1 | 50000 | 530 | 3000 | 480 | 500 |

VOLTAGE SURGE SUPPRESSION POWER CIRCUITS

The invention described herein may be manufactured and used by or for the Government of the United States of America for governmental purposes without the payment of any royalties thereon or therefor.

BACKGROUND OF THE INVENTION

1. Field of the Invention

This invention relates to the field of voltage surge protection and more particularly to the protection of equipment from large voltage surges and voltage transients such as result from lightning discharges and inductive load switching.

2. Background Information

Voltage surge and voltage transient suppressors are commonly used between a power source and its electrical load. Such suppressors protect the equipment from surges and transients or spikes as may occur on the power line due to switching of inductive loads on the power line or lightning strikes on the power line. In addition, surge suppressors prevent switching transients generated within a load from being reflected back into the power source and to other equipment.

For certain applications, it is necessary that the surge suppressor meet the following characteristics. Spike voltages of amplitudes up to and including a 2500 volt peak as specified in MIL-STD-1399(NAVY), Section 300A, and the standard $1.2 \times 50$ $\mu s$, 6000 V and $8 \times 20$ $\mu s$, 3 kA voltage and current impulse waves respectively, specified in IEEE Standard 587-1980, must be attenuated to a level less than two times the peak voltage of the nominal system voltage. The suppressor must be effective in the frequency range of 2 kHz to 500 kHz. A series type suppressor must not cause more than 0.25% voltage drop at rated load and nominal operating line frequency. If more than one suppressor is used in a series arrangement, the total voltage drop of all units in series must be limited to 0.25% of the line voltage. A series type suppressor must be able to withstand repetitive inrush currents which, for example, in motor circuits can be six times the rated full load current. A shunt type suppressor must be capable of operating at rms voltage levels up to 121% of the nominal line voltage of the system being protected. The suppressor must be able to dissipate the energy contained in the spike as limited by the impedance of the source. The leakage or standby current drawn by the suppressor should be limited to 1% of the rated line current. The requirements of attenuating the spike voltage to a level less than two times the peak voltage of the nominal system voltage, and limiting the voltage drop across the suppressor to 0.25% of the line voltage, are particularly difficult to meet simultaneously.

Several types of devices useful as surge suppressors are known in the prior art. These include gas tubes, silicon avalanche suppressors, capacitors, and metal oxide varistors (MOVs).

A gas tube is basically a spark gap with the electrodes hermetically sealed in a gas-filled ceramic enclosure to lower the breakover (or breakdown) voltage. This type of device is small and inexpensive and has the capability of withstanding pulse currents up to 20000 amperes. When the device breaks over, the typical arc voltage ranges from 10 to 30 volts. However, the breakdown voltage of a spark gap device varies, for at a fixed set of conditions, the breakdown voltage is dependent on the rise time of the applied surge. For example, the typical sparkover voltage for a presently available gas tube rated for a 460 $V_{ac}$ application ranges from 1100 volts for a 100 volt per microsecond surge rise time to 1500 volts for a 10 kilovolt per microsecond surge rise time. Note that these are typical breakover voltages which are subject to additional variations at distinct surge rise times. As a result, depending on the applied transient, several microseconds may elapse before a typical gas tube arcs over, leaving the leading portion of the surge intact to be passed on to the equipment operating on the power line. Although the gas tube diverts the majority of the surge current when it breaks over, the leading portion of the surge, frequently called a surge remnant, can contain a considerable amount of energy and have a high voltage amplitude. To clip the surge remnant, a common practice is to insert an L-section suppression circuit in the line following the gas tube. This circuit consists of a series impedance and a voltage clamping device, such as a MOV or a silicon avalanche suppressor, connected across the power line. The series impedance is connected between the gas tube and the clamp and can simply be a resistor or an inductor, or both; a resistor being suitable only for low voltage, low current applications. The impedance must be high enough in value to guarantee gas tube breakover so that the clamp only clips and diverts the energy in the remnant, not the energy in the entire surge. A major problem associated with gas tubes is "follow-on" current, the current from the power source which continues flowing through the gas tube after the surge current terminates. In ac circuits, the follow-on current clears when the line current goes through zero but the gas tube could be re-ignited on the next cycle. A typical gas tube is rated to handle a 60 Hz, one-half cycle peak current of only 20 amperes, hence, if the power source can deliver much higher currents, i.e., a 460 $V_{ac}$ power line, the gas tube could be destroyed, particularly if it breaks over at the beginning of a cycle. In dc applications, a separate means for extinguishing the arc must be included in the circuit. Frequently, the follow-on current is limited to a safe value by connecting a low value resistor or a clamp such as a MOV in series with the gas tube. This technique, however, can significantly raise the clamping voltage if the surge current level is high.

Silicon avalanche suppressors are essentially large junction zener diodes specifically designed for transient protection, functioning as a clamp and providing suppression in just a few nanoseconds. Presently, the major limitation of this device is its low energy dissipation capability as compared with gas tubes and MOV's.

A capacitor placed across the power line is a simple form of surge filter. The impedance of the capacitor forms a voltage divider with the surge source impedance resulting in the attenuation of transients at high frequencies, the higher the capacitance value, the greater the attenuation. Frequently, an inductor is placed in series in the line before the capacitor to form an L-section low pass filter which is an effective transient suppressor. A bi-directional transient suppressor is formed by a T-section low-pass filter which has an inductor in line on either side of a shunt capacitor. This simple approach may have undesirable side effects such as: unwanted resonances with the inductive components located in the circuit; high in-rush currents during turn-on and switching; excessive reactive load on the power system; high leakage current, especially in 400

Hz applications when the capacitance value is high; and, high voltage drop across the inductors. To limit the standby current, an inductor is sometimes connected in parallel with the filter capacitor to form a tank circuit tuned to the power line frequency. Although this allows high values of shunt capacitors to be used which provides greater attenuation of transients, a circulating current flows in the tank circuit continuously. Depending on the component values selected, this circulating current may be quite high, resulting in substantial heating of these circuit elements. Usually, such tank circuit components are large and heavy. Also, the problems applicable to low pass filters described above are equally applicable to tank circuits.

Metal Oxide Varistors (MOVs) are devices which clamp and are usually connected directly across a power line. The device does not clamp until a voltage transient (spike) occurs which exceeds the line voltage by a sufficient amount. As the voltage transient rises, the MOV nonlinear impedance results in a spike current through the device which rises faster than the voltage across it. This produces the clamping action of the device. The clamping voltage depends on the line impedance and the impedance of the voltage spike source. If the spike source and line impedance are low, the spike current through the MOV is high, and hence the clamping voltage is high. If the spike source and line impedances are high, both the spike current through the MOV and the clamping voltage are low. When the spike source impedance is very low, several thousand amperes can flow through the MOV. Although MOVs can handle currents of this magnitude, they can do so only for a limited number of times before the device fails. To reduce the surge current through the MOV and thereby the clamping voltage, an inductor is connected in series to form an L-section as with a capacitor. By adding an inductor in the line on either side of the MOV, a bi-directional T-section transient suppressor is formed. As the series inductance value is increased, the surge current through the MOV is decreased. This results in a lower clamping voltage, but at the cost of high line voltage drop across the inductors. Hence, with this approach, the ability to limit a spike voltage amplitude of up to 6000 V peak to a level of less than two times the peak voltage of the nominal system voltage, and the ability to limit the voltage drop to less than 0.25% at rated load, and nominal operating line frequency cannot be met simultaneously.

SUMMARY OF THE INVENTION

An object of this invention is to provide voltage surge and transient suppressors using clusters of metal oxide varistors.

Yet another object of this invention is to provide a bi-directional voltage surge and transient suppressor using clusters of metal oxide varistors in a manner that the suppressors may be easily paralleled to provide suppressors of higher current carrying capability with a very low line voltage drop.

An additional object of this invention is to provide a surge and transient suppressor using clusters of metal oxide varistors to attenuate surges and transients to a level less than two times the peak voltage of the nominal system voltage.

A further object of the present invention is to provide a surge and transient suppressor that is light in weight and compact in size.

Briefly, this invention contemplates the provision of clusters of two or more MOV's in parallel for suppressing surges and transients. Particular embodiments are disclosed for both grounded and ungrounded power systems. Also disclosed are uni-directional and bi-directional suppressors. Uni-directional means that the suppressor is intended to be placed between a source and a load for the purpose of preventing voltage surges and transients from being propagated from the source into the load. Bi-directional suppressors are intended to be placed between a source and a load to provide suppression in both directions simultaneously.

Suppressors in accordance with the present invention are characterized in that they are easily paralleled formulating suppressors of higher current carrying capacity and lower line voltage drop than one such circuit operating individually. Suppression is provided by appropriately placed clusters of metal oxide varistors. Connecting several MOVs in parallel makes the clamping voltage lower than that achieved with one MOV operating alone. Each MOV in a cluster is matched with each other MOV in the cluster by means of high current pulse tests. Paralleling MOVs of the same disc size and rms voltage rating, in a cluster, also increases the amount of surge energy that can be dissipated. Moreover, the number of high current surges that a cluster of MOVs can withstand is significantly greater than that of a single MOV. In turn, paralleling circuits of the present invention allows an increase in the amount of steady state current that can be applied to a load while limiting the line voltage drop to a low level.

BRIEF DESCRIPTION OF THE DRAWINGS

FIG. 14 is a table of maximum clamping voltages.

DETAILED DESCRIPTION OF THE INVENTION

This invention encompasses both uni-directional and bi-directional surge and transient suppressors. As used within this specification, uni-directional surge and transient suppressors protect a load from voltage surges and transients originating at the power source. A bi-directional surge suppressor of the present invention not only protects the load from surges, and transients from the supply, but also protects the supply from surges and transients that may be generated within the load and reflected back toward the source.

Figure 1:
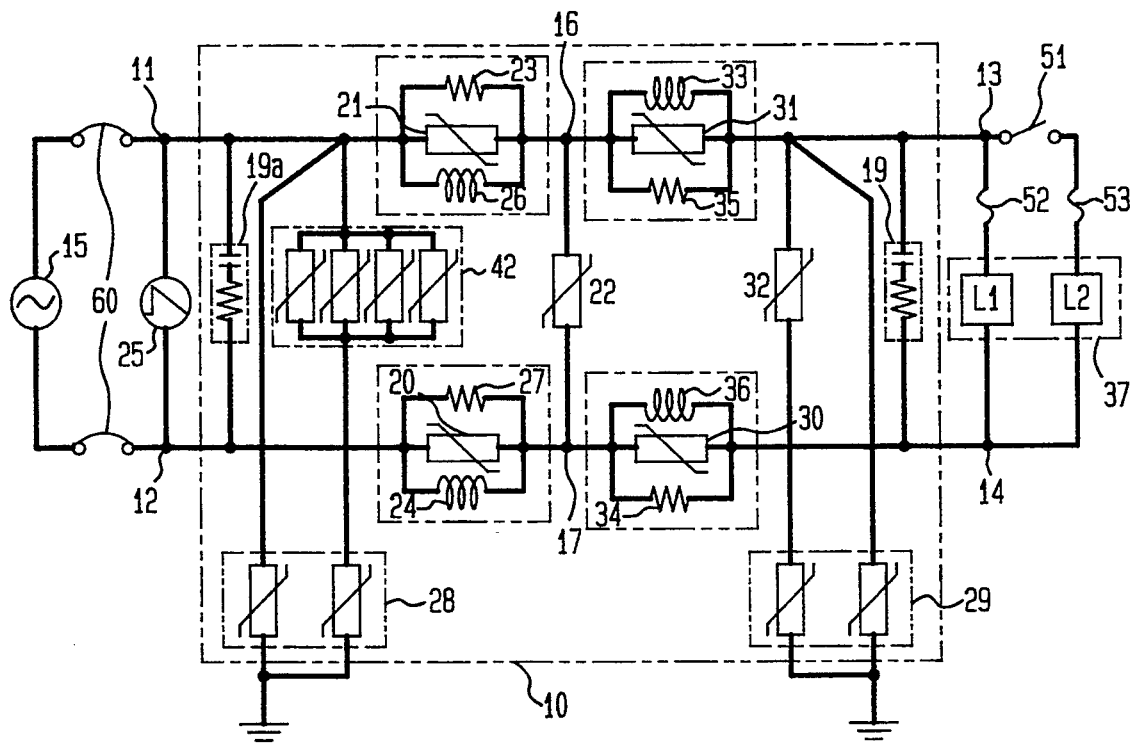
FIG. 1 illustrates a bi-directional multi-stage passive voltage surge and transient suppression circuit adapted for an ungrounded power system.

Referring now to FIG. 1, a first embodiment of a hi-directional surge suppressor of the present invention is illustrated generally as 10. A bi-directional surge suppressor will protect the load from voltage surges generated by the power supply, but will also prevent any voltage surges generated in the load such as by switching of inductors, from being reflected back into the power source for transmission to other loads or especially in the case of an electronic power source, from damaging the power source. Surge suppressor 10 has input nodes or terminals 11 and 12 and output nodes 13 and 14. A power source is represented generally as 15 and is an ungrounded power source. When the power source is grounded, such that node 12 is grounded, alterations may be made in the circuitry as are explained below. Surge suppressor 10 is considered to be a multi-stage surge suppressor, with the input nodes of the surge suppressor 10 being nodes 11 and 12, and the output nodes of the surge suppressor 10 being nodes 13 and 14. Although a single stage will provide significant attenuation, a multi-stage configuration is preferred since it has been found that in most cases, multi-stages are required to attenuate the voltage surge to a level of less than two times the peak voltage of the nominal system voltage.

Within surge suppressor 10, a cluster of MOVs, 32 and 42, are connected across the line at each end of the suppression circuit for reasons which will become apparent below. An MOV cluster comprises two or more discrete MOVs connected in parallel, as will be explained in more detail subsequently. The discrete parallel connected MOVs are illustrated schematically in connection with cluster 42 of FIG. 1. In the remaining Figures, a single MOV or a cluster of MOVs will be designated by the numerals 22 and 32 respectively, when connected between intermediate nodes 16 and 17 and between output nodes 13 and 14.

MOV clusters 32 and 42 preferably comprise at least three, preferably four, or possibly five individual MOVs connected in parallel to share the surge current. Connecting three or more smaller disc size MOVs of the same disc size and rms voltage rating in parallel, acts to reduce the clamping voltage of the cluster when the cluster is subjected to the voltage surge, as shall be explained in greater detail at the end of this description of operation. A parallel combination of inductor 23, damping resistor 26, and MOV 21 are connected between input node 11 and intermediate node 16, and a parallel combination of inductor 24, damping resistor 27 and MOV 20 are connected between input node 12 and intermediate node 17. A parallel combination of inductor 33, damping resistor 35, and MOV 31 are connected between intermediate node 16 and output node 13, and a parallel combination of inductor 34, damping resistor 36 and MOV 30 are connected between intermediate node 17 and output node 14. For the shunt position between intermediate nodes 16 and 17, a single MOV 22 is used so that only two line-to-line varistor clusters are ever required regardless of how many surge suppression circuits are paralleled. Series R-C filters 19 and 19a are connected across the line at each end of the surge suppression circuit as shown in FIG. 1.

For purposes of explanation, assume that a voltage surge, represented schematically as 25, originates from voltage source 15. Initially, inductors 23 and 24 do not pass any surge current. Four-MOV cluster 42 consisting of, for example, V150LA20B MOVs is connected across the line at the voltage source end of the surge suppressor with no inductance between the surge source and the cluster, except for the power lines. Without inductor isolation, the surges are applied directly to the MOV cluster 42, thus preventing any large increases in impulse current width through this cluster. This four-MOV cluster 42 passes the bulk of the impulse current and sharply drops the surge voltage 25 before the surge reaches the parallel combination of the inductor 23 and 24, MOV 21 and 20, and the damping resistor 26 and 27. The remaining (or residual) impulse current is both reduced in amplitude and increased in width; first, by inductor pair 23 and 24 and then by inductor pair 33 and 34. As a result, the clamping voltages across MOV 22 and MOV cluster 32 are successively lowered and the surge voltage at the load 37 is easily reduced to two times the peak voltage of the nominal system voltage, as required. A four-MOV cluster pair 28 and a four-MOV cluster pair 29 are connected from line-to-ground at both ends of the suppression circuit in order to suppress line-to-ground surges. The four-MOV cluster pairs 28 and 29 are comprised of V150LA20B varistors in case a power line is permanently or intermittently grounded. If this should happen, full line voltage will be present across the MOV cluster connected from the still ungrounded power line to ground. Series R-C filters 19 and 19a are across the line at each end of the surge suppression circuit in order to prevent a clamping voltage overshoot at the load and the power source, respectively. Air core inductors and noninductive resistors are preferred. The primary functions of damping resistors 26, 27, 35, and 36 are to reduce oscillations and ringing, and to limit the inductive voltage kick that occurs across inductors 23, 24, 33 and 34 when a rated load current is interrupted by opening switch 51. These damping resistors, however, will not limit the voltage across the aforementioned inductors to a sufficiently low value under fault conditions. Referring to FIG. 1, should either load $L_1$ or $L_2$ fail shorted, the corresponding fuse 52 or 53 will blow after drawing very high fault current. If slow-blow fuses are used, the problem is exacerbated because the fault current will be even higher. If only circuit breaker protection 60 is present, which is the case in many instances, heavy fault current will flow before the circuit breaker trips. Returning to the fuse scenario: after a fuse opens, a voltage spike is developed across each line inductor which increases in amplitude in accordance with the equation $V_L = -di_{fc}/dt$, where $i_{fc}$ is the fault current that was interrupted. Even if the damping resistors are limited in value to several ohms, the sum of the voltages developed across each resistor-inductor pair will cause line-to-line varistor 22 and varistor clusters 32 and 42 to conduct and clamp these voltage spikes. As a result, the voltage across any other load operating on the power line will exceed the specified limit.

To solve this problem, a V82ZA12 varistor 20, 21, 30 and 31 is connected in parallel with each inductor-resistor pair 24 and 27, 23 and 26, 34 and 36, and 33 and 35 respectively, as shown in FIG. 1. This MOV has an rms voltage rating of 50 $V_{ac}$ and a maximum specified clamping voltage of 145 Volts at 50 amperes. At 150 amperes, the maximum specified clamping voltage is about 160 volts, hence, the total voltage across the load 37 cannot exceed 320 volts and will be less due to the clamping action of MOV cluster 32 which protects the load. Moreover, depending on the magnitude of the load current, MOVs 20, 21, 30 and 31 provide better protection of the load than the damping resistors when a heavy load current is interrupted by switch 51. For 440 $V_{ac}$ applications, a V150ZA8 MOV should be used. Another advantage to this approach is that MOVs 20, 21, 30 and 31 will remain inactive when a surge or transient originates from either the power source 15 or the load 37. When this occurs, MOV clusters 42 or 32 clamp the transient or surge to such a low level that the voltage differential across each parallel inductor-resistor-MOV combination—which is one-half of the difference in clamping voltage developed between an external MOV cluster 42 or 32 and the centrally located MOV 22—is too low to cause MOVs 20, 21, 30 and 31 to conduct.

As stated above, the voltage surge suppression circuit of FIG. 1 is intended for use on ungrounded power supply systems such as are found aboard U.S. Navy ships. In power supply systems where one line is grounded at input node 12, hereafter designated as common node 18, inductors 24 and 34, resistors 27 and 36, four MOV clusters 29, and MOVs 20 and 30, as shown in FIG. 1, may be eliminated, resulting in a circuit configuration as shown in surge suppression circuit 10a in FIG. 2. In this instance, preferably, inductors 23a and 33a have twice the inductance value as inductors 23 and 33 of FIG. 1 when each of the circuits is designed for a similar steady state current carrying capacity.

Figure 2:
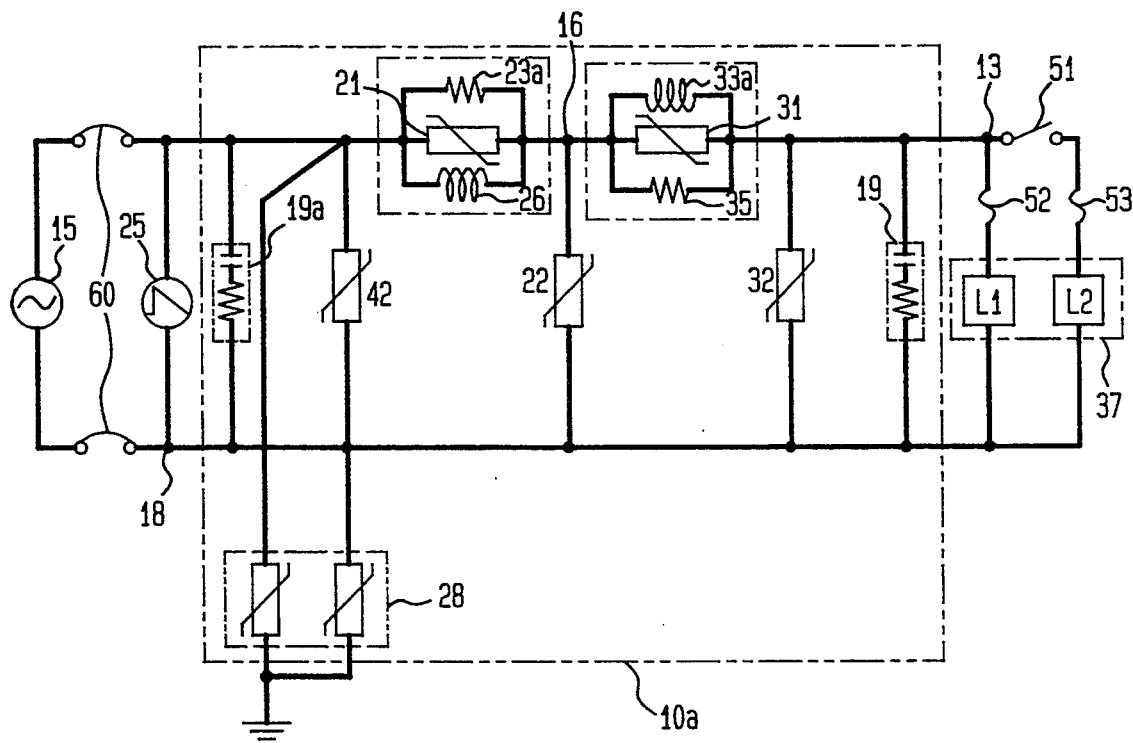
FIG. 2 illustrates a bi-directional multi-stage passive voltage surge and transient suppression circuit adapted for a grounded power system.
Figure 12:
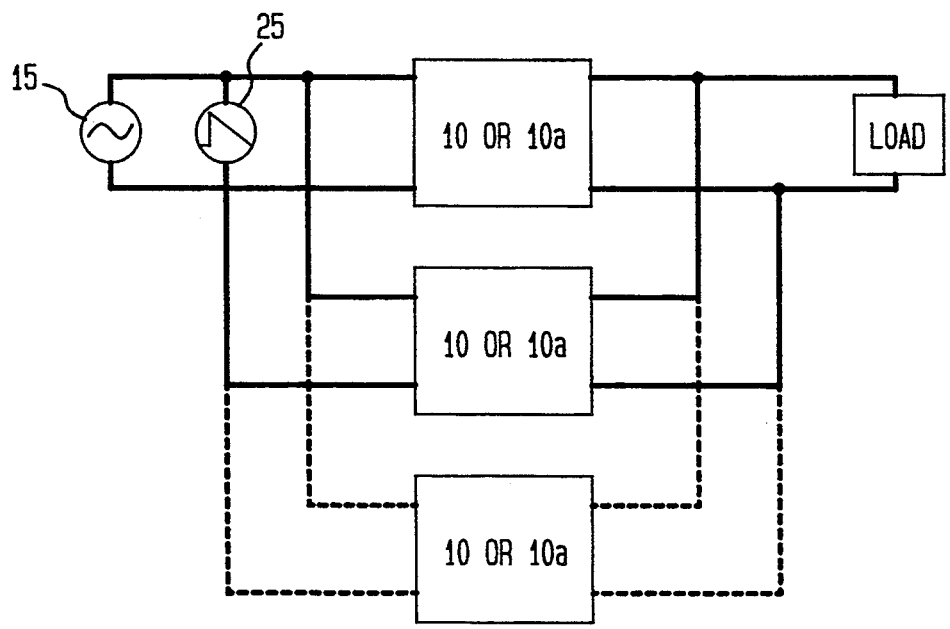
FIG. 12 generally illustrates paralleling two or more of the circuits of either FIGS. 1, 2, 3, 4 or 5.
Figure 13:
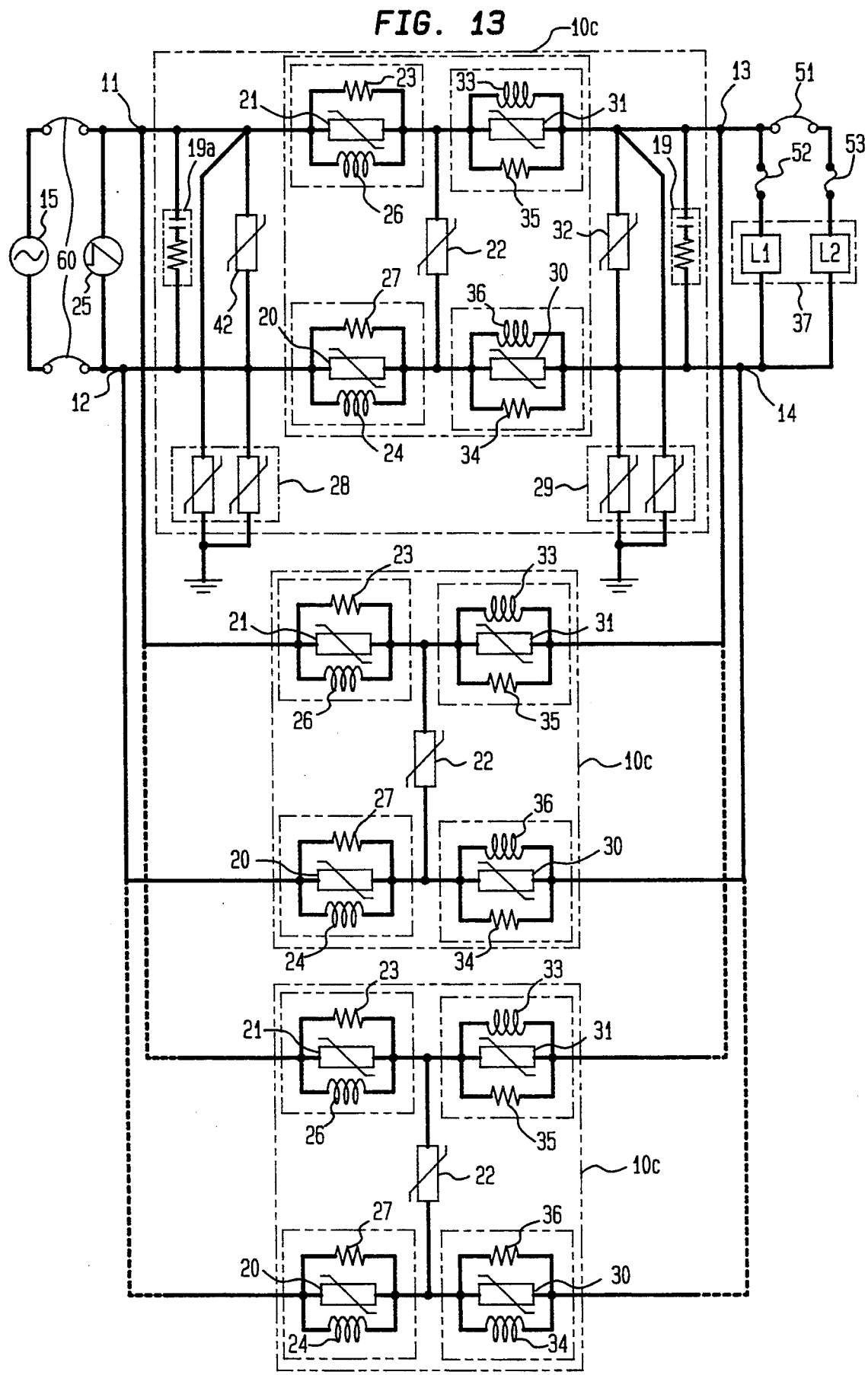
FIG. 13 provides a more detailed illustration of the paralleling of two or more of the bi-directional multistage passive voltage surge and transient suppression circuits of FIG. 1.

The circuits of FIG. 1 and FIG. 2 are readily adaptable for controlling voltage surges where the load current is in the 15 ampere range and load 37 is supplied from a 50 to 60 Hz power source. At much higher loads, and when the power source frequency is 400 Hz such as that used on Navy ships and aircraft, the voltage drop across suppressor 10 will exceed the 0.25 percent limit. In higher current and frequency applications, these limitations may be overcome by paralleling two or more substantially identical surge suppressors in a manner illustrated in FIG. 12 for suppressors 10 and 10a. As a more detailed example, additional suppressors such as illustrated by 10c in FIG. 13 can be added in parallel, as shown, to the bi-directional multi-stage surge suppressor for an ungrounded system of FIG. 1 to provide additional current carrying capacity while limiting the voltage drop to the specified level. Paralleling the suppressors effectively reduces the series inductance. If two substantially identical surge suppression circuits 10 and 10a are paralleled, the effective series inductance is cut in half and an equal amount of surge current and line current is drawn by each circuit 10 or 10a. Therefore, since each series inductor is now carrying one-half the load, the cross sectional area of the conductor in inductors 23, 24, 33, and 34 in FIG. 1 and in inductors 23a and 33a in FIG. 2 can be made smaller, reducing the physical size of each inductor. Moreover, paralleling surge suppressors 10 or 10a engenders a reduced clamping voltage across each centrally located line-to-line MOV 22. Consequently, each individual inductor in the circuit may be reduced in value as the number of paralleled suppressors 10 or 10a is increased in order to provide a still further reduction in total series inductance and keep the line voltage drop across the surge suppressor within the required limit. For any selected number of paralleled suppressors 10 or 10a, the lowest permissible inductance value for each individual inductor in suppressors 10 or 10a can be established by subjecting the paralleled circuits to a standard test wave, and verifying that the test surge is clamped to two times the peak voltage of the nominal system voltage, or less, by MOV cluster 32, as required. An important advantage derived from paralleling any number of suppressors 10 or 10a is that the centrally located MOVs 22 in the paralleled sections form a nearly perfectly matched MOV cluster. Whichever direction the surge or transient emanates from, an outermost cluster 42 or 32 absorbs nearly all of the surge energy, as explained above. The remaining surge current is divided equally by the in-line inductor-resistor-varistor combinations in each of the paralleled units, an equal portion of the remaining surge current flowing through each centrally located MOV 22 with the small leftover surge currents remnants being summed in the MOV cluster farthest from the surge source. The surge current sharing by each centermost varistor 22 will not be perfect however, since each varistor 22 will have a slightly different clamping voltage.

Figure 3:
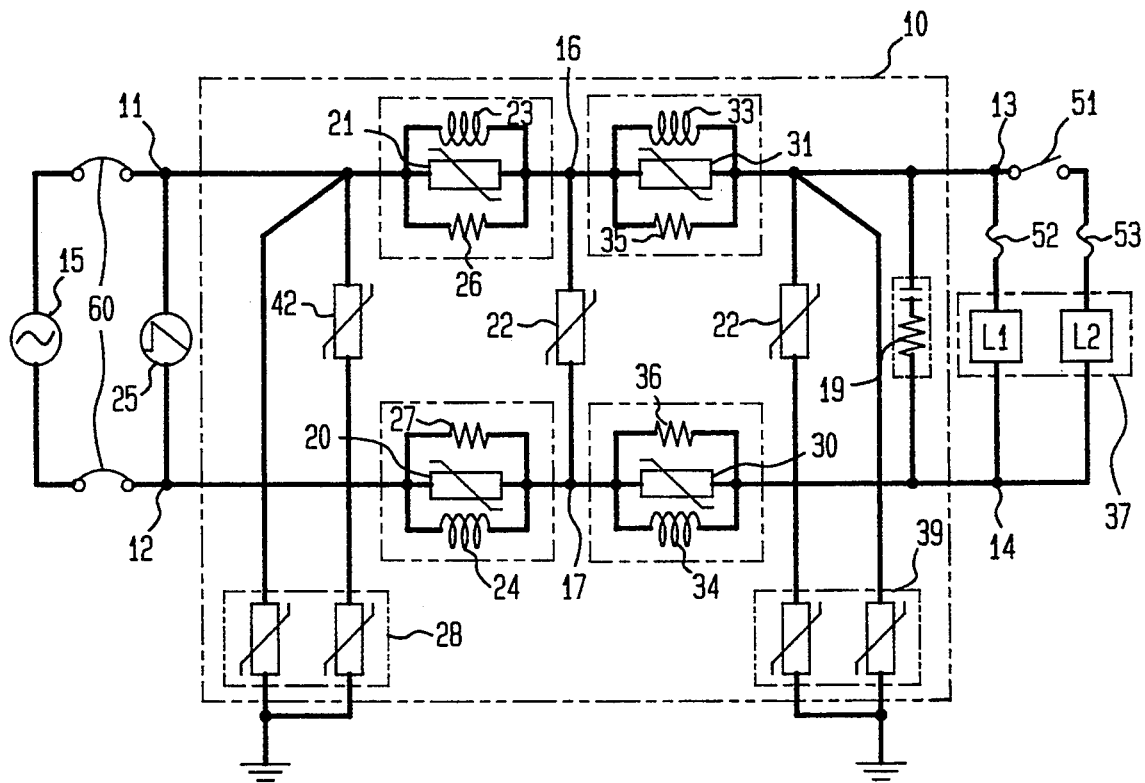
FIG. 3 illustrates a uni-directional multi-stage passive voltage surge and transient suppression circuit adapted for an ungrounded power system.

A modification of the circuit shown in FIG. 1 results in a uni-directional voltage surge suppression circuit 70 for an ungrounded power source, FIG. 3, that is used primarily for protecting the load 37 from voltage surges and transients 25 originating from the source 15. The uni-directional circuit configuration is basically the same as the bi-directional version, except for a few changes. The line-to-line R-C filter at the power source has been eliminated, the four-MOV cluster protecting the load has been replaced with a single V150LA20B varistor, and the four-MOV clusters connected from each line to ground at the load have been replaced with single V150LA20B varistors. For FIG. 3 and the remaining FIGS. 5, 8 and 10, single MOVs connected from each line to ground at the load are identified by the symbol 39. Although this circuit configuration has been classified as a uni-directional voltage surge suppressor in this patent specification, it also functions to protect the source 15 from surges and transients generated by the load 37. However, since only a single MOV instead of an MOV cluster is now connected line-to-line at the load end of surge suppressor 70, MOV cluster 42, in FIG. 3, clamps at a higher voltage level than MOV cluster 42, in FIG. 1, under identical load generated surge voltage conditions.

Figure 4:
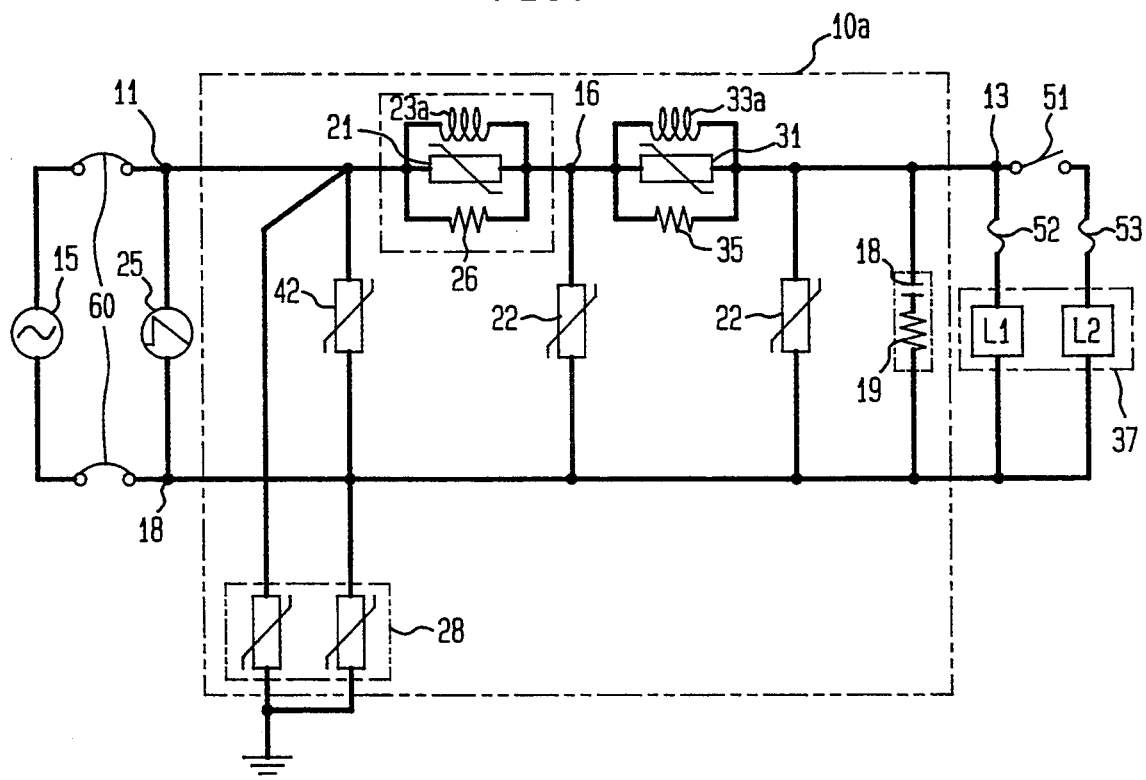
FIG. 4 illustrates a uni-directional multi-stage passive voltage surge and transient suppression circuit adapted for a grounded power system.

FIG. 4 shows a uni-directional multi-stage surge suppressor circuit for use in grounded power systems. Inductors 24 and 34, resistors 27 and 36, MOVs 39 and MOVs 20 and 30, as shown in FIG. 3, may be eliminated and replaced with short circuits resulting in a circuit configuration as shown in FIG. 4. In this instance, preferably, inductors 23a and 33a have twice the inductance value as inductors 23 and 33 of FIG. 1 when each of the circuits is designed for a similar steady state current carrying capacity.

Figure 5:
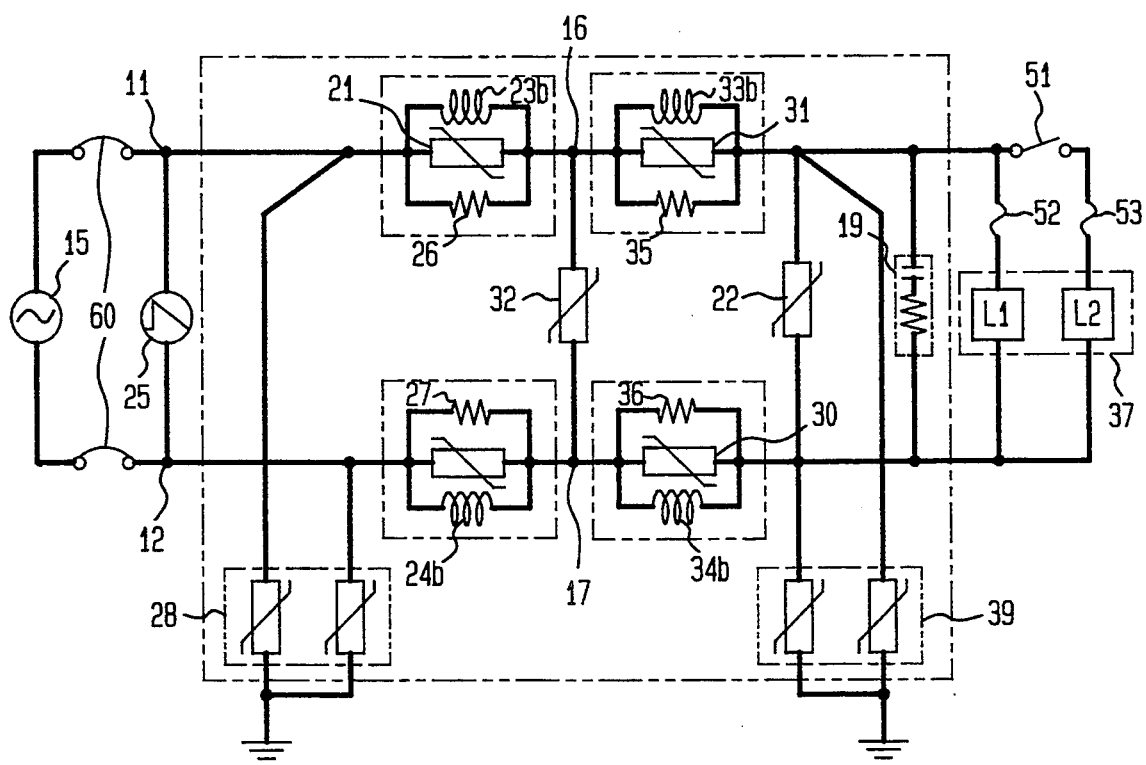
FIG. 5 illustrates an alternative uni-directional multi-stage passive voltage surge and transient suppression circuit adapted for an ungrounded power system.

FIG. 5 shows an alternative uni-directional multi-stage voltage and transient surge suppressor. In this embodiment, MOV cluster 42 has been eliminated and an MOV cluster 32 has been connected between intermediate nodes 16 and 17 in place of single MOV 22. With MOV cluster 42 removed, line-to-ground clusters 28 and 29, which are effectively connected in series across the power line, act as a substitute for the eliminated cluster 42 and clamp impulse voltage 25 to a voltage level which is twice that of cluster 42 in FIG. 3. Since the clamping voltage at this first stage in the suppression circuit is double that of the preferred uni-directional embodiment, the remaining impulse current passed on to the succeeding suppression stages is higher than in the preferred embodiment. To equal the performance of the preferred uni-direction embodiment, the following circuit modifications are made. First, an MOV cluster 32 is connected between intermediate nodes 16 and 17 in place of a single MOV 22 to absorb the additional surge energy and to effect a reduction in clamping voltage. Recall that a cluster of matched MOVs has a lower clamping voltage than a single MOV, as stated above. Secondly, the inductance value of inductors 23b and 24b is increased to reduce the remaining impulse current amplitude, which results in an additional decrease in the clamping voltage of MOV cluster 32. The inductance value of inductors 33b and 34b in the final suppression stage is proportionally reduced so that the sum of the inductances of inductors 23b, 24b, 33b and 34b in FIG. 5 is equal to that of the inductors 23, 24, 33 and 34 in the preferred embodiment. With these changes, the desired performance characteristics are achieved by this alterative uni-directional voltage surge suppression circuit. The alternative suppression circuit does, however, have two drawbacks which are not present in the preferred embodiment. First, when a number of alternative uni-directional units are paralleled like the configurations in FIGS. 1 through 4 to limit the line voltage drop, the number of line-to-line MOV clusters 32 required equals the number of paralleled units, whereas in the preferred uni-directional embodiment only one line-to-line MOV cluster is ever needed, regardless of the number of paralleled units. Secondly, under surge voltage conditions in 440 $V_{ac}$ applications, the voltage differential across the paralleled inductor-resistor-MOV combinations, 23b, 26 and 21, and 24b, 27 and 20, preceding the line-to-line MOV cluster 32 will be higher than that across the corresponding combinations in the preferred embodiment, so damping resistors with an adequate working voltage rating are needed here. As in the case of the voltage surge suppression circuit configurations shown in FIGS. 1 through 4, when several of the alternative units are paralleled, the surge current is divided equally among the parallel paths, whether the surge originates from the source 15 or the load 37. Consequently, the matched MOV clusters 32 connected between intermediate nodes 16 and 17 in each of the paralleled alternate units are also closely matched to each other with no selection process required. Each centrally located line-to-line cluster 32 will have a slightly different clamping voltage, so the current sharing between clusters will not be identical. Recall that this characteristic is also present in the centrally located MOVs 22 in the surge suppression circuits of FIGS. 1 through 4 when these units are similarly paralleled, as explained above.

For rated load current levels below ten amperes, the uni- and bi-directional surge suppression circuits in FIGS. 6 through 10 can meet the required line voltage drop and clamping voltage limits using only two surge suppression stages, as shown. The suppressors in FIGS. 6 through 10 are basically two-stage versions of FIGS. 1 through 5 respectively, as a comparison between the corresponding drawings readily shows. In each of these suppressors, the total series inductance is made higher than the total inductance of the corresponding multi-stage configuration. The increased series inductance effects a greater reduction in the magnitude of the residual surge current passed on to the second suppression stage than occurs in the multi-stage units, therefore, only one additional suppression stage is needed in these suppressor configurations to limit the surge voltage at the load to two times the peak amplitude of the nominal system voltage, as required. Although the increased series inductance causes an increase in the voltage drop across the two-stage suppression circuits presented in FIGS. 6 through 10, this increase is effectively negated by the reduced voltage drop across these suppressors due to the lower load current.

Figure 6:
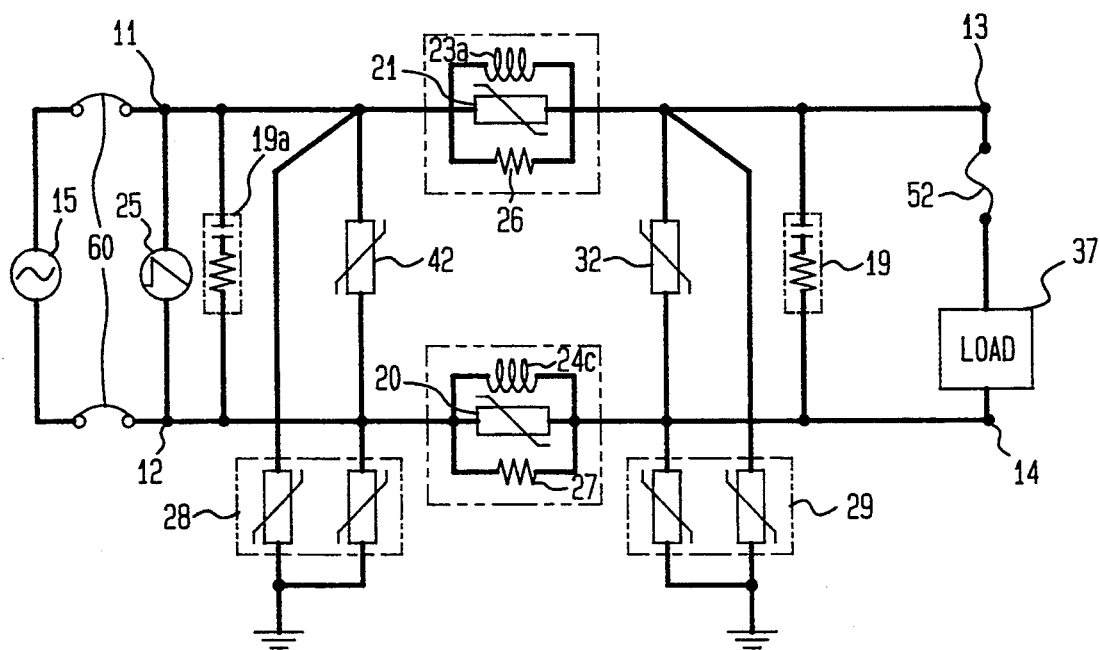
FIG. 6 illustrates a bi-directional two-stage passive voltage surge and transient suppression circuit adapted for an ungrounded power system.

FIG. 6 is an ungrounded bi-directional two-stage surge suppressor. This embodiment is similar to FIG. 1. Inductors 33 and 34, damping resistors 35 and 36, MOVs 30 and 31, and MOV 22, components which essentially comprise a surge suppression stage, have been eliminated. Inductors 23 and 24 have been replaced by inductors 23c and 24c respectively, each of which has an inductance value greater than two times the inductance value of inductors 23 and 24, as explained above.

Figure 7:
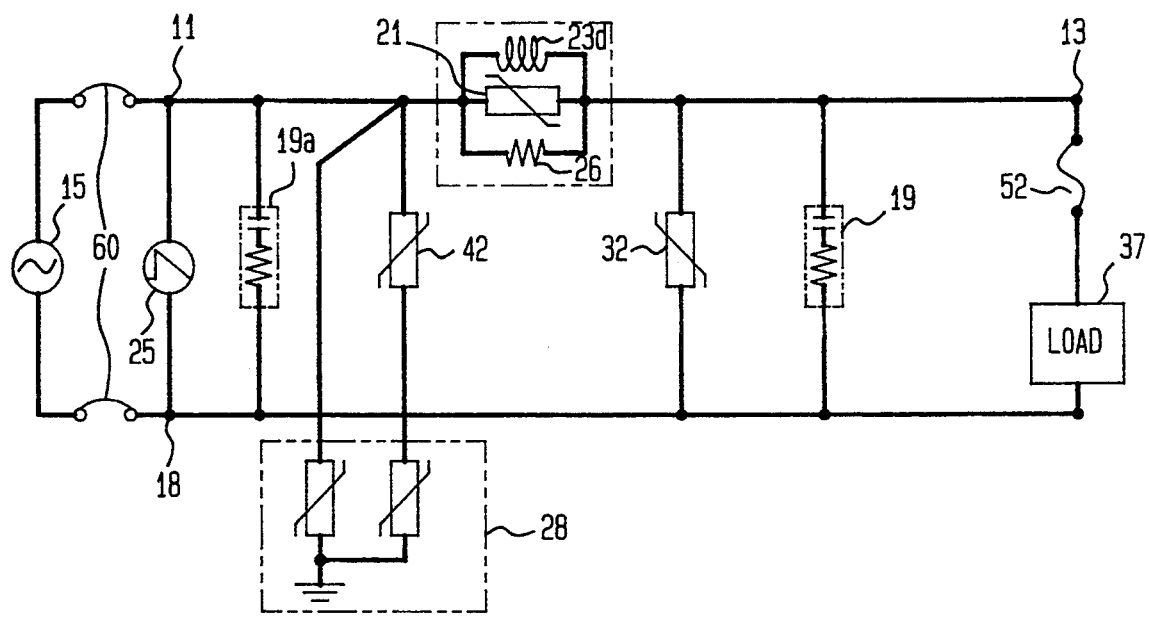
FIG. 7 illustrates a bi-directional two-stage passive voltage surge and transient suppression circuit adapted for a grounded power system.

FIG. 7 is a grounded hi-directional two-stage surge suppressor. This embodiment is similar to FIG. 2. Here, inductor 33a, damping resistor 35, and MOVs 22 and 31 have been eliminated. Inductor 23a has been replaced by inductor 23d which has an inductance value greater than twice that of inductor 23a.

Figure 8:
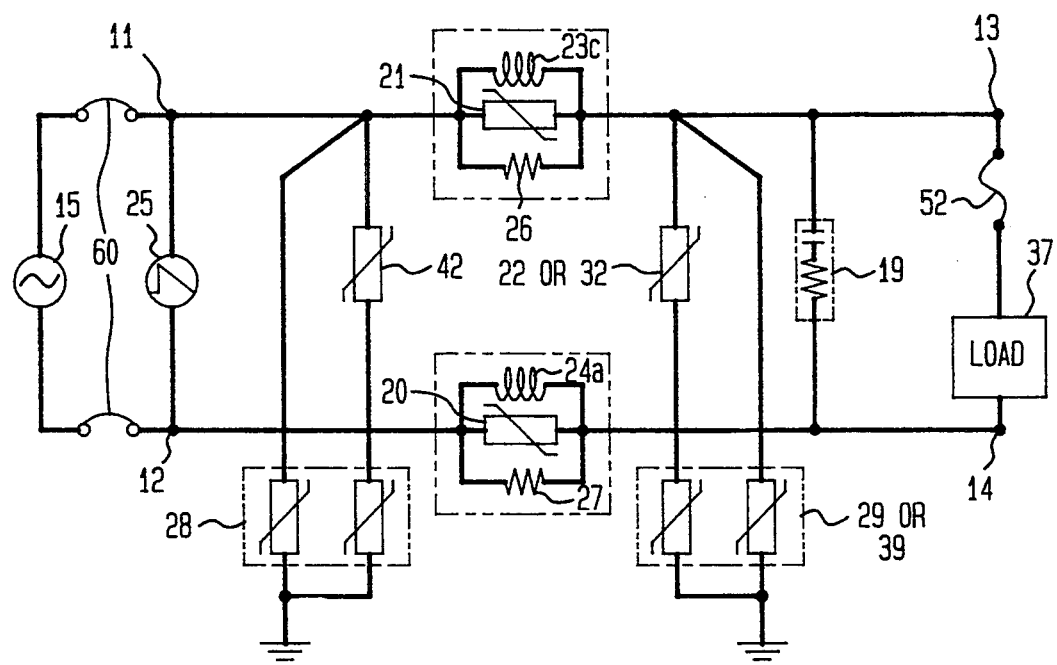
FIG. 8 illustrates a uni-directional two-stage passive voltage surge and transient suppression circuit adapted for an ungrounded power system.

FIG. 8 is an ungrounded uni-directional two-stage surge suppressor. This embodiment is similar to FIG. 3. Inductors 33 and 34, damping resistors 35 and 36, and MOVs 22, 30 and 31 have been eliminated. As in FIG. 6, inductors 23 and 24 have been replaced by inductors 23c and 24c respectively, each of which has an inductance value greater than two times the inductance value of the replaced inductors. At the load, either an MOV 22 or an MOV cluster 32 can be connected across the line, and either a pair of MOV clusters 29 or a pair of individual MOVs 39 can be connected from each line to ground, as shown.

Figure 9:
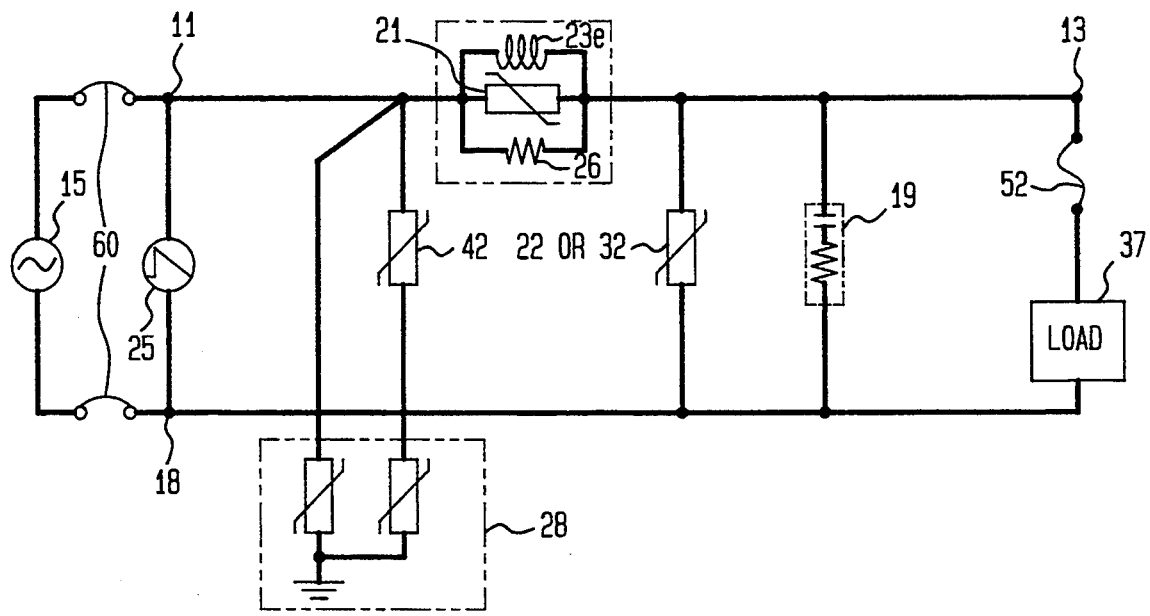
FIG. 9 illustrates a uni-directional two-stage passive voltage surge and transient suppression circuit adapted for a grounded power system.

FIG. 9 is a grounded uni-directional two-stage suppressor. This embodiment is similar to FIG. 4. Inductor 33a, damping resistor 35, and MOVs 22 and 31 have been eliminated. As in FIG. 7, inductor 23a has been replaced by inductor 23d which has an inductance value greater than twice that of inductor 23a. At the load, either an MOV 22 or an MOV cluster 32 can be connected across the line.

Figure 10:
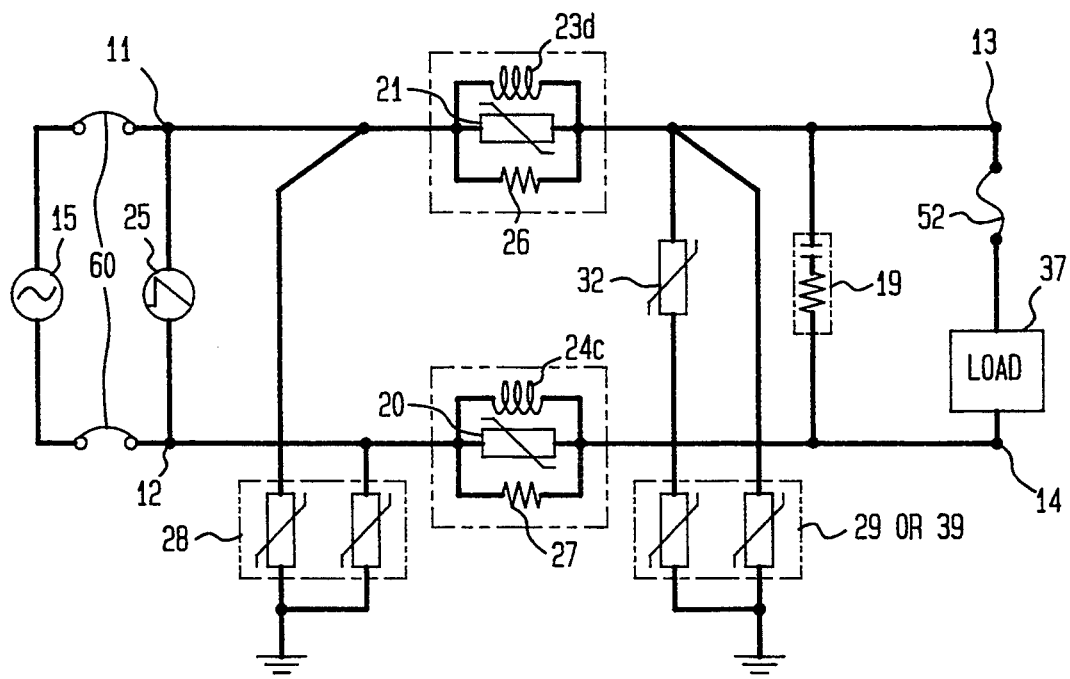
FIG. 10 illustrates an alternative uni-directional two-stage passive voltage surge and transient suppression circuit adapted for an ungrounded power system.

FIG. 10 shows an alternative uni-directional two-stage surge suppressor. This embodiment is similar to and functions like the alternative uni-directional multi-stage surge suppressor shown in FIG. 5. The electrical circuit configuration is the same as that of FIG. 8, except that MOV cluster 42 has been eliminated.

Figure 11:
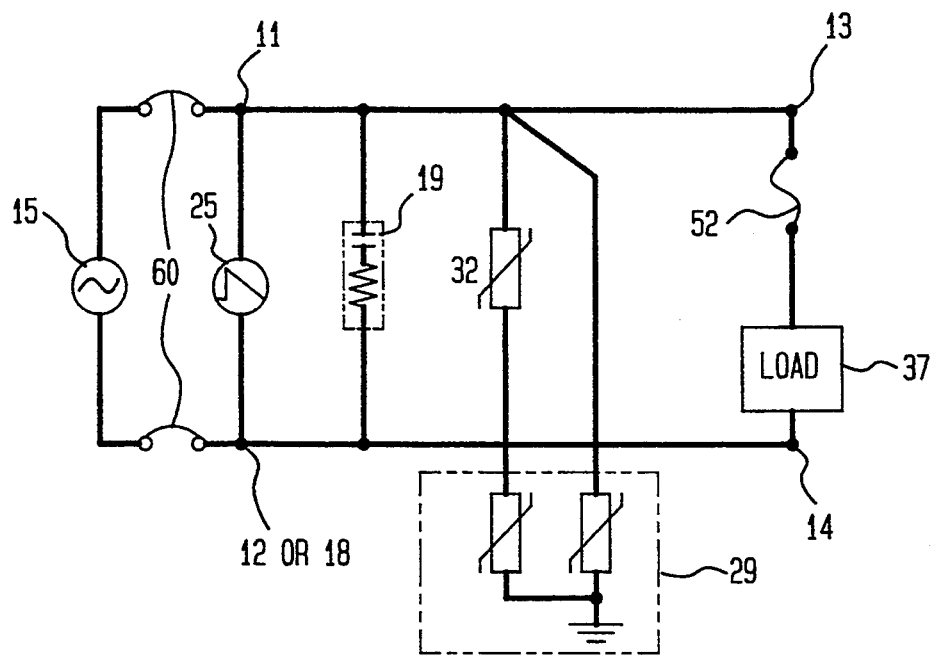
FIG. 11 illustrates the simplest surge suppression circuit.

The most simple surge suppressor is to just use MOV clusters with four, or perhaps five, paralleled metal oxide varistors as shown in FIG. 11. This totally eliminates the problems with: line voltage drop, paralleling multi-stage units, damping resistors, circuit complexity, power line frequency, size and weight, ad infinitum. Although this embodiment cannot limit the voltage surge 25 at a load 37 to two times the peak amplitude of the nominal system voltage, a cluster of four closely matched 20 mm diameter V150LA20B MOVs connected in parallel, will clamp voltage surge 25 to a maximum peak voltage of 430 volts or less as shown in FIG. 14; a sufficiently low voltage level for the majority of other applications with less stringent requirements.

The voltage surge and transient suppression circuits presented in FIGS. 1 through 10, 12 and 13 cannot limit the line voltage drop across them to 0.25%, while simultaneously limiting spike and surge voltages at the load to a level of two times the peak voltage of the nominal system voltage or less, without utilizing appropriately placed clusters of paralleled smaller diameter MOVs, as shown. FIG. 14 lists the maximum specified clamping voltage, $V_c$, and other characteristics of selected individual and paralleled 150 $V_{ac}$ MOVs with disc sizes ranging from 20 mm to 60 mm in diameter when these devices are subjected to a standard 3000 ampere $8 \times 20$ impulse current wave as recommended by IEEE standard 587-1980 (1980), "IEEE Guide for Surge Voltages in Low-Voltage AC Power Circuits". The listed clamping voltages were obtained from the MOV characteristics published by the manufacturer of these devices. In general, the larger the disc size, the lower the clamping voltage for a specific impulse current magnitude. Also, for any MOV, the clamping voltage decreases as the magnitude of the pulse current through the device decreases. This property means that for a specific impulse current magnitude, connecting several of the same model number MOVs in parallel to form a cluster will result in a significantly lower clamping voltage than that of a single MOV of the same type if the devices in the cluster are matched to ensure reasonably good current sharing. This is clearly shown in FIG. 14, wherein a single V150LA20B MOV has a maximum clamping voltage of 540 volts when subjected to a 3 kA peak current surge whereas a perfectly matched cluster of four paralleled V150LA20B MOVs has a maximum clamping voltage of 430 volts under this same test condition, a considerable decrease in clamping voltage of 110 volts. An additional advantage gained from using clusters of four matched 20 mm MOVs is that the lifetime number of $8 \times 20$, 3 kA current surges such a cluster can withstand is considerably greater than that of a single 20 mm MOV; approximately 150 vs. 4 respectively, as shown in FIG. 14.

From a comparison of the current, energy, and lifetime current pulse ratings given in FIG. 14, it is readily apparent that for all practical purposes, a cluster comprised of four matched 20 mm disc size V150LA20B MOVs connected in parallel is the equivalent of a single 40 mm disc size V151DA40 or a V151DB40 MOV. Similarly, a cluster of three matched V150LA20B MOVs is equivalent to a 32 mm disc size V150HE150 MOV. Moreover, the maximum clamping voltages of the four- and three-MOV clusters comprised of 20 mm devices are 430 volts and 450 volts respectively, compared to 530 volts for both the 40 mm and 32 mm MOVs at a peak impulse current of 3 kA. In fact, the maximum clamping voltage of a cluster of four matched model number V150LA20B MOVs is 50 volts lower than that of a single V151BA60 or V151BB60 MOV, the largest available MOVs which have a disc diameter of 60 mm. An individual 60 mm MOV does, however, have a significantly higher maximum peak current and energy rating than a four-MOV cluster comprised of 20 mm devices and can also withstand a greater number of 3 kA, $8 \times 20$ current impulses; approximately 500 vs. 150 for a 20 mm four-MOV cluster as estimated from the manufacturer's data sheets.

Incrementally increasing the number, n, of MOVs in a cluster will result in an ever lower clamping voltage, but the reduction in $V_c$ slows rapidly as the number of MOVs grows large. This occurs because the reduction in peak current, $I_p$, through each MOV in a cluster diminishes in accordance with the formula $\Delta I = I_p/n + 1 - I_p/n$ whenever another device is added to the cluster. With a 3 kA impulse current for example (refer to FIG. 14), when the number of MOVs is increased from two to three, the shared impulse current through each device drops from 1500 to 1000 amperes, a significant 500 ampere reduction. This yields a drop in maximum clamping voltage of 30 volts, from 480 to 450 volts, for the cluster containing V150LA20B MOVs. Should the number of MOVs in this cluster be increased, say, from ten to eleven, the impulse current through each device in the cluster drops from 300 to 272 amperes, a 28 ampere decline. According to the published characteristics of these particular devices, this will yield a minuscule clamping voltage reduction of 5 volts or less. A cluster with a large number of MOVs will also be both difficult and costly to match; cluster cost, size and complexity would also increase. Therefore, an optimum MOV cluster consists of a minimum of three, preferably four, or a maximum of five 20 mm V150LA20B type MOVs connected in parallel.

While the invention has been described in terms of a single preferred embodiment, those skilled in the art will recognize that the invention can be practiced with modification within the spirit and scope of the appended claims.

Having thus described our invention, what I claim as new and desire to secure by Letters Patent is as follows:

1. A voltage surge and transient suppressor, comprising:

first and second input nodes;
   a first metal oxide varistor cluster electrically connected between said first and second input nodes;
   a second and a third metal oxide varistor cluster electrically connected respectively from said first and said second input nodes to a ground node;
   a parallel combination of a first resistor, a first inductor, and a first metal oxide varistor electrically connected between said first input node and a first intermediate node;
   a parallel combination of a second resistor, a second inductor, and a second metal oxide varistor electrically connected between said second input node and a second intermediate node;
   a parallel combination of a third resistor, a third inductor, and a third metal oxide varistor electrically connected between said first intermediate node and a first output node;
   a parallel combination of a fourth resistor, a fourth inductor, and a fourth metal oxide varistor electrically connected between said second intermediate node and a second output node;
   a fifth metal oxide varistor electrically connected between said first and second intermediate nodes;
   a fourth metal oxide varistor cluster electrically connected between said first and second output nodes;

a fifth and a sixth metal oxide varistor cluster electrically connected respectively from said first and said second output nodes to a ground node;

a series combination of a fifth resistor and a first capacitor electrically connected between said first and second input nodes; and a series combination of a sixth resistor and a second capacitor electrically connected between said first and second output nodes.

2. Voltage surge and transient suppressors as in claim 1, wherein said inductors are of air core construction.

3. Voltage surge and transient suppressors as in claim 1, wherein each said cluster of metal oxide varistors comprises a plurality of individual metal oxide varistors of the same disc size, same rms voltage rating, and with substantially matched characteristics of current sharing.

4. A voltage surge and transient suppressor, comprising:

first and second input nodes;

a first metal oxide varistor cluster electrically connected between said first and second input nodes;

a second and a third metal oxide varistor cluster electrically connected respectively from said first and said second input nodes to a ground node;

a parallel combination of a first resistor, a first inductor, and a first metal oxide varistor electrically connected between said first input node and a first intermediate node;

a parallel combination of a second resistor, a second inductor, and a second metal oxide varistor electrically connected between said second input node and a second intermediate node;

a parallel combination of a third resistor, a third inductor, and a third metal oxide varistor electrically connected between said first intermediate node and a first output node;

a parallel combination of a fourth resistor, a fourth inductor, and a fourth metal oxide varistor electrically connected between said second intermediate node and a second output node;

a fifth metal oxide varistor electrically connected between said first and second intermediate nodes;

a sixth metal oxide varistor electrically connected between said first and second output nodes;

a seventh and an eighth metal oxide varistor electrically connected respectively from said first and said second output nodes to a ground node; and a series combination of a fifth resistor and a first capacitor electrically connected between said first and second output nodes.

5. A voltage surge and transient suppressor comprising:

first and second input nodes;

a first metal oxide varistor cluster electrically connected between said first and second input nodes;

a second and a third metal oxide varistor cluster electrically connected respectively from said first and said second input nodes to a ground node;

a parallel combination of a first resistor, a first inductor, and a first metal oxide varistor electrically connected between said first input node and a first output node;

a parallel combination of a second resistor, a second inductor, and a second metal oxide varistor electrically connected between said second input node and a second output node;

a fourth metal oxide varistor cluster electrically connected between said first and second output nodes;

a fifth and a sixth metal oxide varistor cluster electrically connected respectively from said first and said second output nodes to a ground node;

a series combination of a third resistor and a first capacitor electrically connected between said first and second input nodes; and a series combination of a fourth resistor and a second capacitor electrically connected between said first and second output nodes.

* * * * *